(12) United States Patent
Cheng (10) Patent No.: US 8,111,710 B2
(45) Date of Patent: Feb. 7, 2012

(54) METHOD AND APPARATUS FOR RECEIVING FEEDBACK CORRESPONDING TO MULTICAST BROADCAST SERVICE

(75) Inventor: Ray-Guang Cheng, Keelung (TW)

(73) Assignee: National Taiwan University of Science and Technology, Taipei (TW)

( * ) Notice: Subject to any disclaimer, the term of this patent is extended or adjusted under 35 U.S.C. 154(b) by 393 days.

(21) Appl. No.: 12/358,242

(22) Filed: Jan. 23, 2009

(65) Prior Publication Data

US 2010/0189025 A1  Jul. 29, 2010

(51) Int. Cl.
*H04W 4/08* (2009.01)
(52) U.S. Cl. ........ 370/437; 370/313; 370/329; 370/465; 455/450; 455/455
(58) Field of Classification Search .................. 370/437, 370/465; 455/450, 455
See application file for complete search history.

(56) References Cited

U.S. PATENT DOCUMENTS

| | | | |
|---|---|---|---|
| 2008/0045228 A1* | 2/2008 | Zhang et al. | 455/450 |
| 2008/0253462 A1* | 10/2008 | Singh et al. | 375/240.25 |
| 2009/0060010 A1* | 3/2009 | Maheshwari et al. | 375/211 |
| 2010/0255859 A1* | 10/2010 | Park et al. | 455/458 |

* cited by examiner

*Primary Examiner* — Huy Vu
*Assistant Examiner* — Maria Sekul
(74) *Attorney, Agent, or Firm* — Jianq Chyun IP Office (57) ABSTRACT

The invention is directed to a method for receiving a feedback for at least a multicast broadcast service flow transmitting to a plurality of subscriber stations. The method comprises steps of assigning a plurality of code division multiple access (CDMA) codes to a feedback corresponding to the multicast broadcast service flow and then performing an allocation process for allocating a feedback channel for the subscriber stations. Thereafter, an announcement process is performed to announce a multiple feedback condition, the CDMA codes and the feedback channel to the subscriber stations. A channel monitoring process is performed for receiving a negative-acknowledgment (NACK)-based feedback sending from one of the subscriber stations unsatisfied with the multiple feedback condition and the NACK-based feedback is in a form of one of CDMA codes corresponding to the multicast broadcast service flow and is transmitted through the feedback channel.

22 Claims, 7 Drawing Sheets

METHOD AND APPARATUS FOR RECEIVING FEEDBACK CORRESPONDING TO MULTICAST BROADCAST SERVICE

BACKGROUND OF THE INVENTION

1. Field of Invention

The present invention relates to a method for receiving feedback and allocating radio resource corresponding to a multicast broadcast service. More particularly, the present invention relates to a method for receiving negative-acknowledgment-based feedback in form of a code division multiple access code.

2. Description of Related Art

The multicasting technique (one-source-many-destination) is widely utilized for multimedia content delivery in the Internet. In the recent years, a number of portal sites offer Internet protocol multicast services to be extended using wireless transmission to the mobile stations. With the aforementioned service, a wireless system broadcasts data packets to the subscriber stations and each subscriber station receives and processes the same stream of packets.

Normally, multicast and broadcast services (MBS) are offered in the downlink only. Subscriber stations either in awake/sleep mode or in idle mode should be able to receive the subscribed multicast and broadcast service flows. It has been shown in the literature that the number of synchronized transmitting cells in an MBS zone, the cell size, and the users' location distribution are factors that may affect the selection of modulation and coding scheme (MCS) state. Unfortunately, the network cannot dynamically allocate the radio resource (e.g., transmission power control, MCS state selection, HARQ parameter setting) due to the lack of a feedback mechanism. In order to enhance the spectral efficiency of MBS, a feedback mechanism with low signaling overhead is required for both awake/sleep and idle subscriber stations that receiving the same MBS service to report their service qualities.

SUMMARY OF THE INVENTION

Accordingly, at least one objective of the present invention is to provide a method for receiving a feedback corresponding to a multicast broadcast service capable of minimizing the uplink signaling overhead.

At least another objective of the present invention is to provide a method for dynamically adapting transmission condition capable of increasing the bandwidth efficiency.

To achieve these and other advantages and in accordance with the purpose of the invention, as embodied and broadly described herein, the invention provides a method for receiving a feedback for at least a multicast broadcast service flow transmitting to a plurality of subscriber stations. The method comprises steps of assigning a plurality of code division multiple access (CDMA) codes to a feedback corresponding to the multicast broadcast service flow and then performing an allocation process for allocating a feedback channel for the subscriber stations. Thereafter, an announcement process is performed to announce a multiple feedback condition, the CDMA codes and the feedback channel to the subscriber stations. A channel monitoring process is performed for receiving a negative-acknowledgment (NACK)-based feedback sending from one of the subscriber stations unsatisfied with the multiple feedback condition and the NACK-based feedback is in a form of one of CDMA codes corresponding to the multicast broadcast service flow and is transmitted through the feedback channel specified by the BS or network.

According to one embodiment of the present invention, the multiple feedback conditions, the CDMA codes and the feedback channel are announced to the subscriber stations through a control channel or a general broadcasting channel in the downlink direction.

According to one embodiment of the present invention, the subscriber stations are at the operation modes including an awake mode, a sleep mode and an idle mode.

According to one embodiment of the present invention, the feedback channel includes a random access-based channel. Also, the random access-based channel is a single common random access channel or a multiple random access channel.

According to one embodiment of the present invention, the multiple feedback condition comprises at least one of signal-to-noise ratio (SNR), packet-error rate (PER), peak signal-to-noise ratio (PSNR) and channel-quality indicator (CQI). Also, the CQI further comprises physical carrier to interference plus noise ratio (CINR), effective CINR and multiple-in-multiple-out-related feedback.

According to one embodiment of the present invention, the method further comprises step of repeating the allocation process, the announcement process and the channel monitoring process successively in a periodical manner or an event-trigger manner.

The invention also provides a method for dynamically adapting a transmission condition of a base station for at least a multicast broadcast service flow transmitting to a plurality of subscriber stations. The multicast broadcast service flow is transmitted at a current transmission level with a first modulation-and-coding scheme (MCS) level and a first transmission power. The method comprises steps of assigning a plurality of CDMA codes to a feedback corresponding to the multicast broadcast service flow and performing a transmission adapting process and repeating the transmission adapting process. Moreover, the transmission adapting process comprises steps of sending a multicast-poll message to the subscriber stations and adapting the current transmission level according to a feedback received status of the base station. Furthermore, the multicast-poll message indicates a feedback condition of a new transmission level with a second transmission power and/or a second MCS level, the CDMA codes and a feedback channel allocated for transmitting the feedback.

According to one embodiment of the present invention, in the step of adapting the current transmission level, when the feedback received status of the base station shows at least a NACK-based feedback from one of the subscriber stations, which is unsatisfied with the feedback condition, is received, the current transmission level is maintained. Under the circumstance that at least one NACK-based feedback is received and after the step of adapting the current transmission level, the transmission adapting process further comprises a step of updating the feedback condition including steps of updating the new transmission level by maintaining the second MCS level and increasing the second transmission power if the first transmission power is equal to the second transmission power and the first transmission power is smaller than a maximum transmission power for transmitting the multicast broadcast service flow. Alternatively, the new transmission level is updated by setting the second MCS level to be a less robust MCS level and maintaining the second transmission power if the first transmission power is equal to the second transmission power and the first transmission power is equal to the maximum transmission power. Furthermore, the new transmission level is updated by setting the second transmission power to be equal to the first transmission power and maintaining the second MCS level if the first transmission power is not equal to the second transmission power. Then, the feedback condition is updated according to the updated new transmission level. Furthermore, the NACK-based feedback is in a form of one of CDMA codes corresponding to the multicast broadcast service flow and is transmitted through the feedback channel.

According to one embodiment of the present invention, in the step of adapting the current transmission level, when the feedback received status of the base station shows no NACK-based feedback is received by the base station, the current transmission level is adapted to be equal to the new transmission level. Hence, after the step of adapting the current transmission level, the transmission adapting process further comprises updating the feedback condition including steps of updating the new transmission level by maintaining the second MCS level and decreasing the second transmission power if the first transmission power is equal to the second transmission power. Alternatively, if the first transmission power is not equal to the second transmission power and the power margin between the second transmission power and a maximum transmission power for transmitting the multicast broadcast service flow is large enough to accommodate an MCS adjustment, the new transmission level is updated by restoring the second transmission power to be equal to the maximum transmission power and setting the second MCS level to be a more robust MCS level. Moreover, if the first transmission power is not equal to the second transmission power and the power margin between the second transmission power and the maximum transmission power is not large enough to accommodate an MCS adjustment, the new transmission level is updated by maintaining the second MCS level and decreasing the second transmission power. Then, the feedback condition is updated according to the updated new transmission level.

According to one embodiment of the present invention, the multicast-poll message is sent to the subscriber stations through a control channel or a general broadcasting channel.

According to one embodiment of the present invention, the subscriber stations are at the operation modes including an awake mode, a sleep mode and an idle mode.

According to one embodiment of the present invention, the feedback channel includes a random access-based channel. Also, the random access-based channel is a single common random access channel or a multiple random access channel.

According to one embodiment of the present invention, the feedback condition comprises signal-to-noise ratio (SNR), packet-error rate (PER), peak signal-to-noise ratio (PSNR) and channel-quality indicator (CQI).

The invention further provides an apparatus for dynamically adapting a transmission condition for at least a multicast broadcast service flow transmitting to a plurality of subscriber stations at a current transmission level with a first MCS level and a first transmission power. The apparatus comprises a processor programmed with computer executable instructions. The computer executable instructions performs the steps of assigning a plurality of CDMA codes to a feedback corresponding to the multicast broadcast service flow and then performing a transmission adapting process. Thereafter, the transmission adapting process is repeated. The transmission adapting process comprises steps of sending a multicast-poll message to the subscriber stations through the transceiver and obtaining a feedback received status by monitoring the feedback channel through the transceiver and then adapting the current transmission level according to the feedback received status. It should be noticed that the multicast-poll message indicates a feedback condition of a new transmission level with a second MCS level and a second transmission power, the CDMA codes and a feedback channel allocated for transmitting the feedback.

In the present invention, since the allocated feedback channel, either single common random access channel or multiple random access channel, is shared by subscriber stations in both of the awake/sleep mode and the idle mode, the uplink signaling overhead can be minimized. Furthermore, the use of CDMA code for the subscriber stations to indicate NACK feedback instead of a user-specific message can also minimize the signaling overhead and prevent from packet collisions. Moreover, the method for dynamically adapting transmission condition/radio resource disclosed by the present invention is applied not only to adjust the radio resource at a poor service quality but also to fine tune the radio resource at a service quality satisfying all the subscriber stations to increase the bandwidth efficiency.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
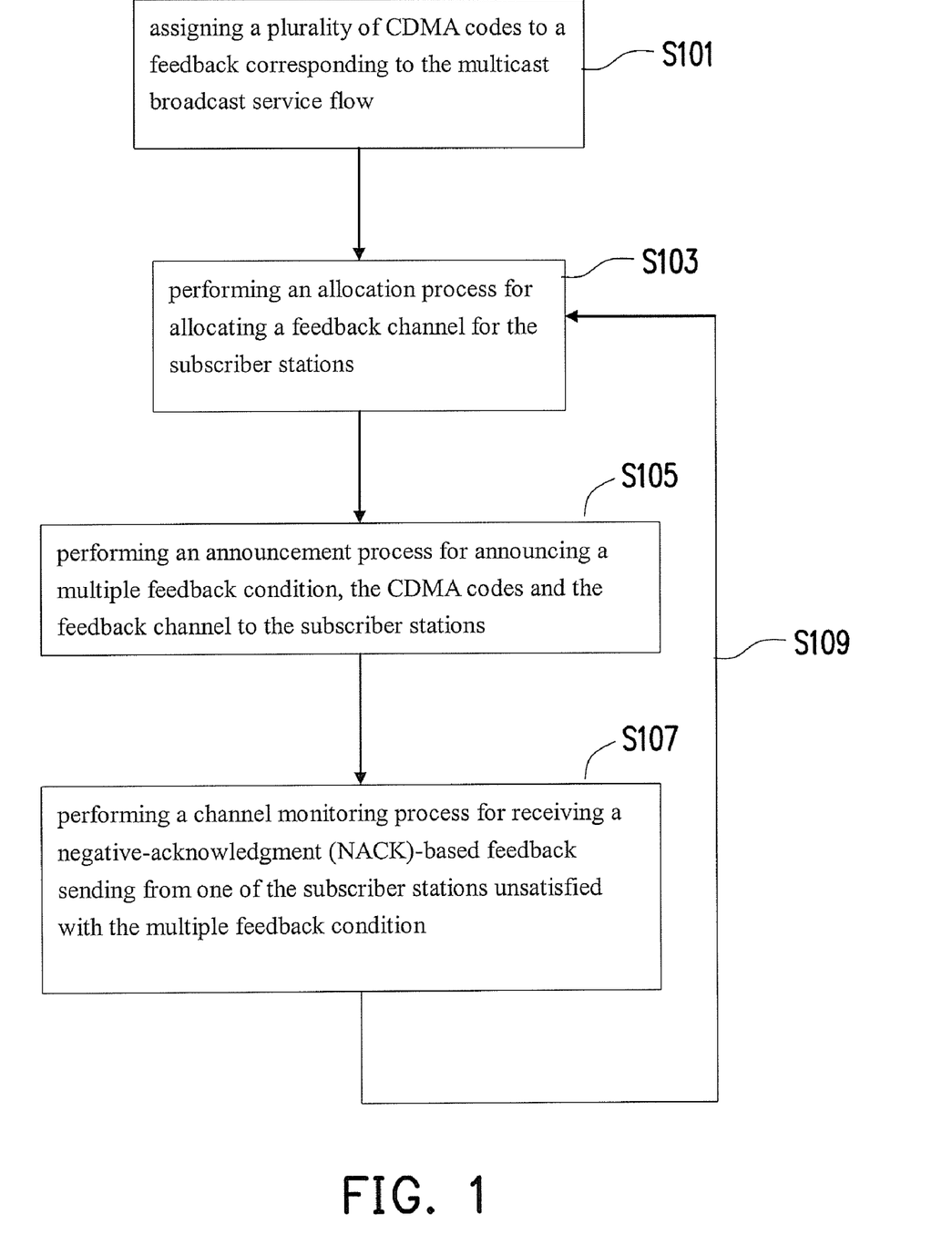
FIG. 1 is a flow chart showing a method for receiving a feedback according to one embodiment of the present invention.

FIG. 1 is a flow chart showing a method for receiving a feedback according to one embodiment of the present invention. In a wireless communication system, the network/base station transmits at least one multicast broadcast service flow to a plurality of subscriber stations. Noticeably, the subscriber stations are at the operation modes including an awake mode, a sleep mode and an idle mode. On the other words, the method of the present invention is used to monitoring the multicast broadcast service transmission condition while the subscriber stations are operated at all kinds of operation modes. As shown in FIG. 1, while the multicast broadcast service flow is continuously transmitted to the subscriber stations, the base station assigns a plurality of code division multiple access (CDMA) codes to a feedback corresponding to the multicast broadcast service flow (step S101). Meanwhile, an allocation process is performed for allocating a feedback channel for the subscriber stations (step S103). Moreover, the feedback channel can be, for example, a random access-based channel which can be shared by the subscriber stations operated at awake mode, sleep mode and idle mode. Also, in one embodiment, the random access-based channel can be, for example but not limited to, a single common random access channel or a multiple random access channel.

Thereafter, in the step S105, an announcement process is performed to send a multicast-poll message for announcing a multiple feedback condition corresponding to the multicast broadcast service flow, the assigned CDMA codes for the feedback and the allocated feedback channel to the subscriber stations. It should be noticed that the multicast-poll message is transmitted to the subscriber stations through a control channel or a general broadcasting channel. In the multicast-poll message, the multiple feedback condition indicates the current radio resource condition for transmitting the multicast broadcast service flow. That is, the multiple feedback condition comprises at least one of signal-to-noise ratio (SNR), packet-error rate (PER), peak signal-to-noise ratio (PSNR) and channel-quality indicator (CQI) of the current radio resource condition. Also, the CQI further comprises physical carrier to interference plus noise ratio (CINR), effective CINR and multiple-in-multiple-out-related feedback.

After the subscriber stations receive the multicast-poll message, at least one of the subscriber stations, which is not satisfied with the multiple feedback information, indicates a negative-acknowledgment (NACK)-based feedback by sending the CDMA code to the base station through the allocated feedback channel (step S107). Simultaneously, at the base station, a channel monitoring process is performed for receiving the NACK-based feedback sending from the unsatisfied subscriber stations. More clearly, the NACK-based feedback is in a form of one of CDMA codes corresponding to the multicast broadcast service flow and is transmitted through the allocated feedback channel. It should be noticed that one feedback channel can be shared by different multicast broadcast service flows with different feedback CDMA codes. Because, at the base station, the NACK-based feedback is in a form of assigned CDMA code instead of the user-specific message, the uplink signaling overhead for channel quality feedback can be minimized.

Furthermore, as shown in FIG. 1, the allocation process, the announcement process and the channel monitoring process are repeated successively in a periodical manner or an event-trigger manner (step S109). Hence, the transmission condition can be real-time monitored throughout the multicast broadcast services.

In the aforementioned embodiment of the present invention, a NACK-based channel quality feedback mechanism for the subscriber stations operated at awake mode, sleep mode and even idle mode is disclosed. However, the application of the NACK-based channel quality feedback mechanism is not limited to the aforementioned real-time channel quality monitor. In the following embodiment, the NACK-based channel quality feedback mechanism of the present invention applied with a novel radio resource management for increasing the bandwidth efficiency is detail described.

Figure 2:
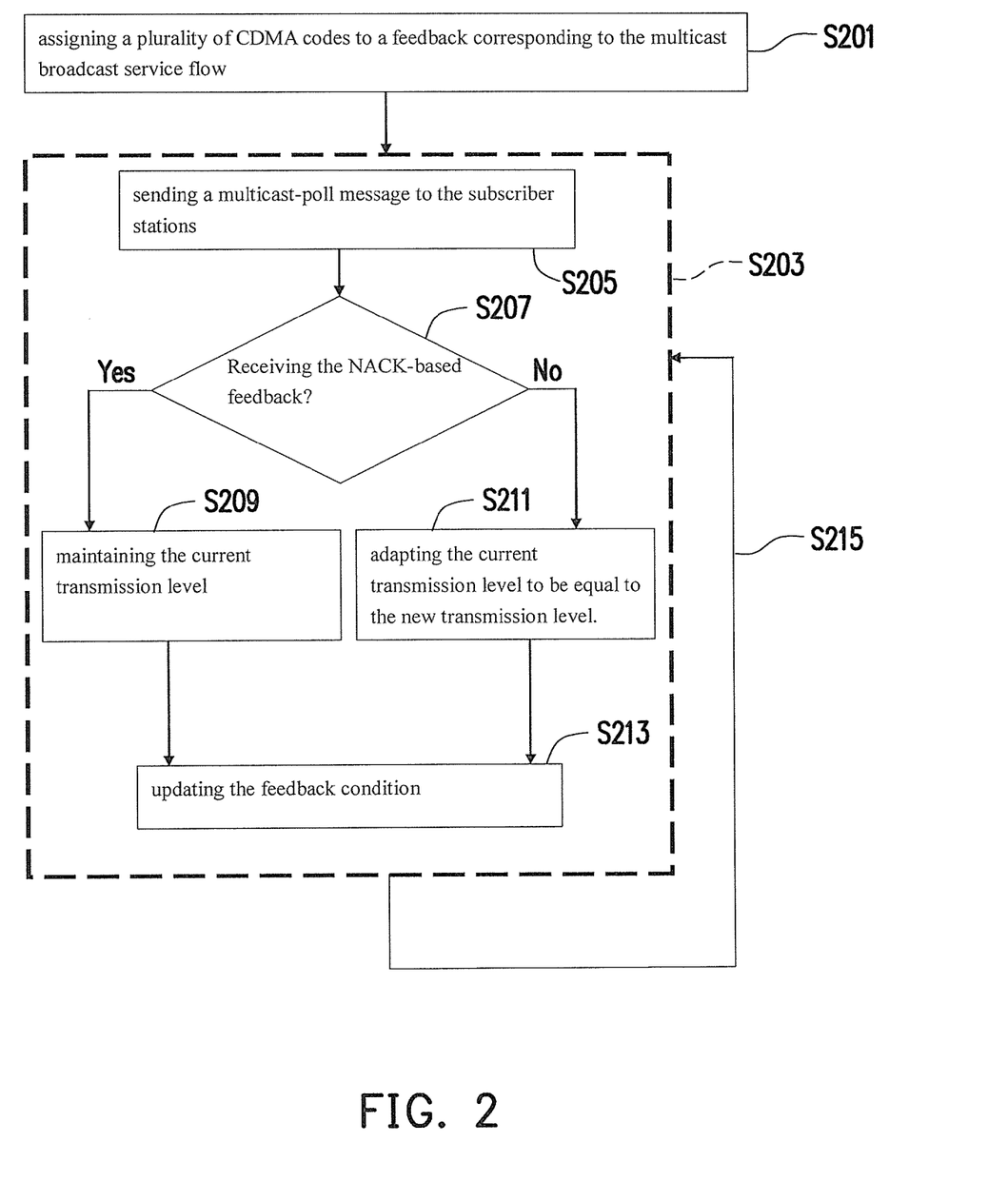
FIG. 2 is a flow chart showing a method for dynamically adapting transmission condition according to one embodiment of the present invention.

FIG. 2 is a flow chart showing a method for dynamically adapting transmission condition according to one embodiment of the present invention. In the present embodiment, a base station provides at least a multicast broadcast service flow transmitting to a plurality of subscriber stations. Similar to the previous embodiment, the subscriber stations are operated in all kinds of operation modes including awake mode, sleep mode and even idle mode. The multicast broadcast service flow is transmitted at a current transmission level with a first modulation-and-coding scheme (MCS) level and a first transmission power. As shown in FIG. 2, in the step S201, a plurality of CDMA codes is assigned to a feedback corresponding to the multicast broadcast service flow.

As shown in FIG. 2, in the step S203, a transmission adapting process is performed. The transmission adapting process comprises sending a multicast-poll message to the subscriber stations (step 205) and adapting the current transmission level according to a feedback received status of the base station (steps 207, 209, 211 and 213). Furthermore, the multicast-poll message indicates a feedback condition of a new transmission level with a second MCS level and a second transmission power, the CDMA codes and a feedback channel allocated for transmitting the feedback. Furthermore, the multicast-poll message is sent to the subscriber stations through a control channel or a general broadcasting channel. Noticeably, the feedback condition of the new transmission level is announced to the subscriber stations for proposing the possible adjustment of current transmission level to the subscriber stations. Furthermore, the feedback condition of the new transmission level can be represented as signal-to-noise ratio (SNR), packet-error rate (PER), peak signal-to-noise ratio (PSNR) and channel-quality indicator (CQI).

Consequently, the subscriber stations respectively estimate the possible channel quality according to the feedback condition indicated in the received multicast-poll message. Thereafter, the subscriber stations which are not satisfied with the estimated service quality will indicate NACK-based feedback by sending the corresponding CDMA codes to the base station through the allocated feedback channel. The allocated feedback channel can be shared by multiple multicast broadcast service flows provided by the base station with different feedback CDMA codes. Also, it should be noticed that the feedback channel can be a random access-based channel. Further, the random access-based channel can be, for example, a single common random access channel or a multiple random access channel.

As shown in FIG. 2, in the step S207 of the process for adapting the current transmission level, a feedback received status of the base station is checked. In the step S209, when the feedback received status of the base station shows at least a NACK-based feedback from one of the subscriber stations, which is unsatisfied with the feedback condition, is received, the current transmission level is maintained.

Alternatively, in the step S211, when the feedback received status of the base station shows no NACK-based feedback is received by the base station, the current transmission level is adapted to be equal to the new transmission level. Further, after the current transmission level is adapted, the method for dynamically adapting transmission condition of the present invention further comprises a step of updating the feedback condition for the next transmission level adaption (step S213). Thereafter, in the step S215, the transmission adapting process is repeated for dynamically adapting the transmission condition of the multicast broadcast service flow provided by the base station. It should be noticed that the timing for initiating the transmission level adaption (S213) can be customized to depend on numbers of consecutive multicast-poll messages sending to the subscribers without receiving any NACK-based feedback. That is, the transmission level adaption according to the NACK-based feedback received status can be triggered after two or more consecutive multicast-poll messages sending to the subscribers without receiving any NACK-based feedback.

Figure 3:
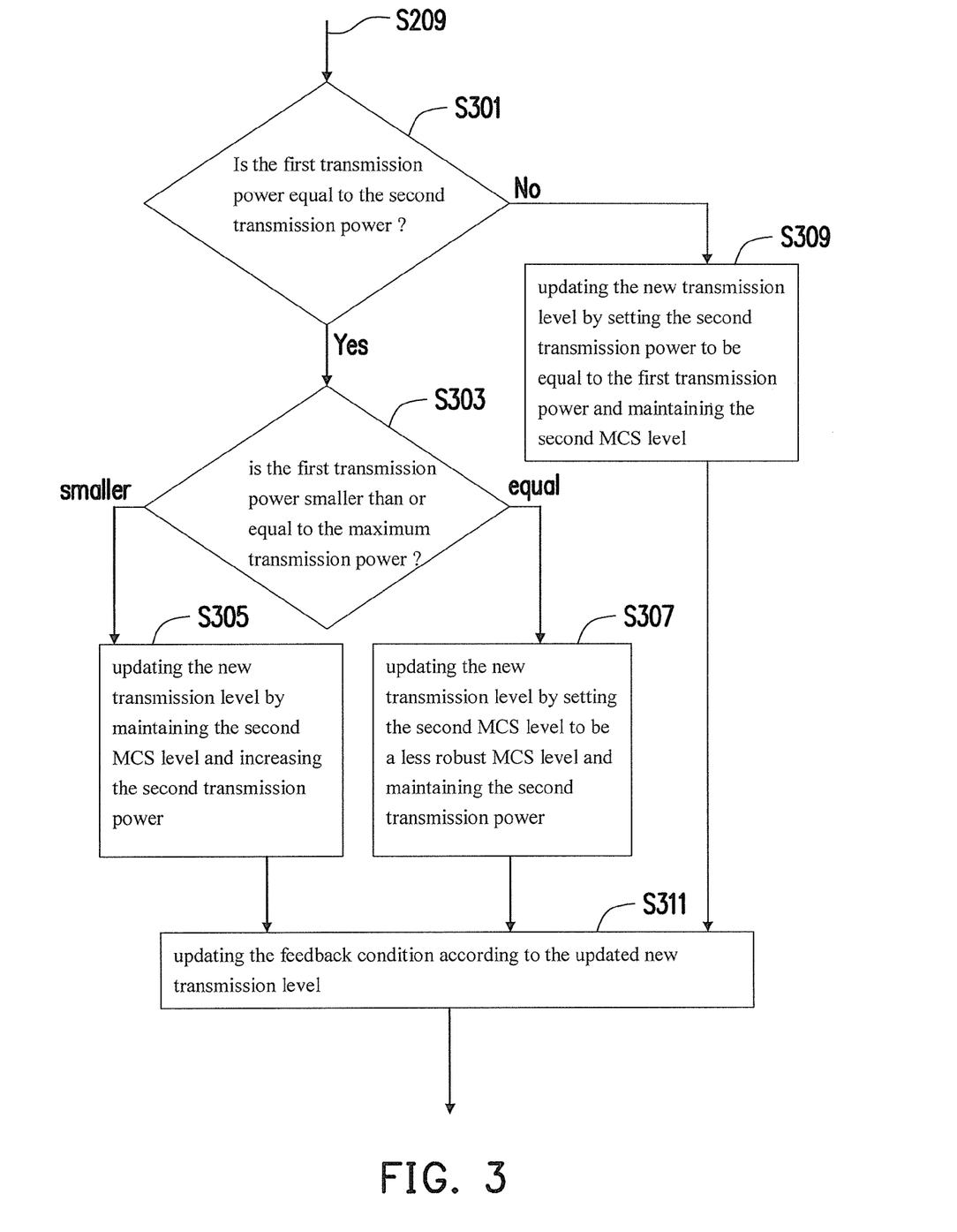
FIG. 3 is a flow chart showing a process for updating the feedback condition while a NACK-based feedback is received according to one embodiment of the present invention.

FIG. 3 is a flow chart showing a process for updating the feedback condition (step S213 in FIG. 2) while a NACK-based feedback is received according to one embodiment of the present invention. As shown in FIG. 3, the step of updating the feedback condition as mentioned above, while at least one NACK-based feedback is received by the base station, is described herein. In the step S301 after the step S209, a relationship between the first transmission power of the current transmission level and the second transmission power of the new transmission level is checked. When the first transmission power is equal to the second transmission power, a relationship between the first transmission power and the maximum transmission power of the base station for transmitting the multicast broadcast service flow is checked (step S303).

Accordingly, under the circumstance that at least one NACK-based feedback is received, when the first transmission power is equal to the second transmission power and the first transmission power is smaller than a maximum transmission power, the new transmission level is updated by maintaining the second MCS level and increasing the second transmission power (step S305). Alternatively, when the first transmission power is equal to the second transmission power and the first transmission power is equal to the maximum transmission power, the new transmission level is updated by setting the second MCS level to be a less robust MCS level and maintaining the second transmission power (step S307). Opposite to the situation that the first transmission power is equal to the second transmission power, when the first transmission power is not equal to the second transmission power, the new transmission level is updated by setting the second transmission power to be equal to the first transmission power and maintaining the second MCS level (step S309). After the new transmission level is updated, the feedback condition is updated according to the updated new transmission level (step S311).

Figure 4:
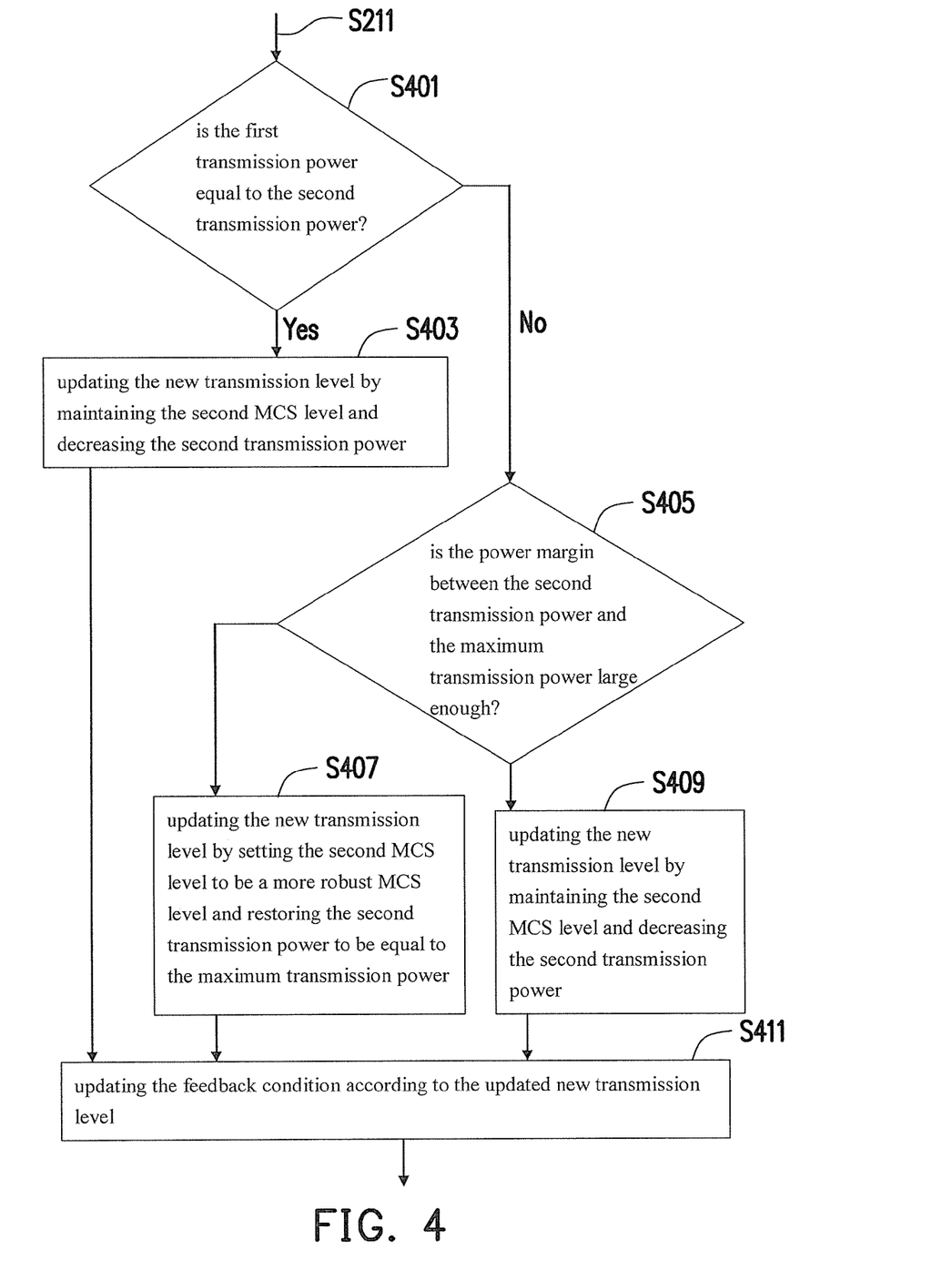
FIG. 4 is a flow chart showing a process for updating the feedback condition while no NACK-based feedback is received according to one embodiment of the present invention.

FIG. 4 is a flow chart showing a process for updating the feedback condition (step S213 in FIG. 2) while no NACK-based feedback is received according to one embodiment of the present invention. As shown in FIG. 4, the step of updating the feedback condition as mentioned above, while no NACK-based feedback is received by the base station, is described herein. In the step S401 after the step S211, a relationship between the first transmission power of the current transmission level and the second transmission power of the new transmission level is checked. As shown in step 403, after the step of adapting the current transmission level, when the first transmission power is equal to the second transmission power, the new transmission level is updated by maintaining the second MCS level and decreasing the second transmission power.

Alternatively, when the first transmission power is not equal to the second transmission power, the power margin between the second transmission power and the maximum transmission power is checked (step S405). Consequently, in the step S407, when the first transmission power is not equal to the second transmission power and the power margin between the second transmission power and the maximum transmission power is large enough to accommodate an MCS adjustment, the new transmission level is updated by setting the second MCS level to be a more robust MCS level and restoring the second transmission power to be equal to the maximum transmission power. On the other hand, in the step S409, when the first transmission power is not equal to the second transmission power and the power margin between the second transmission power and the maximum transmission power is not large enough to accommodate an MCS adjustment, the new transmission level is updated by maintaining the second MCS level and decreasing the second transmission power. After the new transmission level is updated, the feedback condition is updated according to the updated new transmission level (step S411).

The embodiments shown in FIG. 2, FIG. 3 and FIG. 4 together illustrate a transmission adapting process according to whether the NACK-based feedback is received. In the previous embodiments, the multicast-poll message indicates the feedback condition of a new transmission level with new MCS level and new transmission power which the base station are going to modulate. Another embodiment is illustrated herein is with respect to an adapting process with a situation that the hybrid automatic repeat-request (HARQ) NACK-based feedback in a form of CDMA code is received through the allocated feedback channel.

Figure 5A:
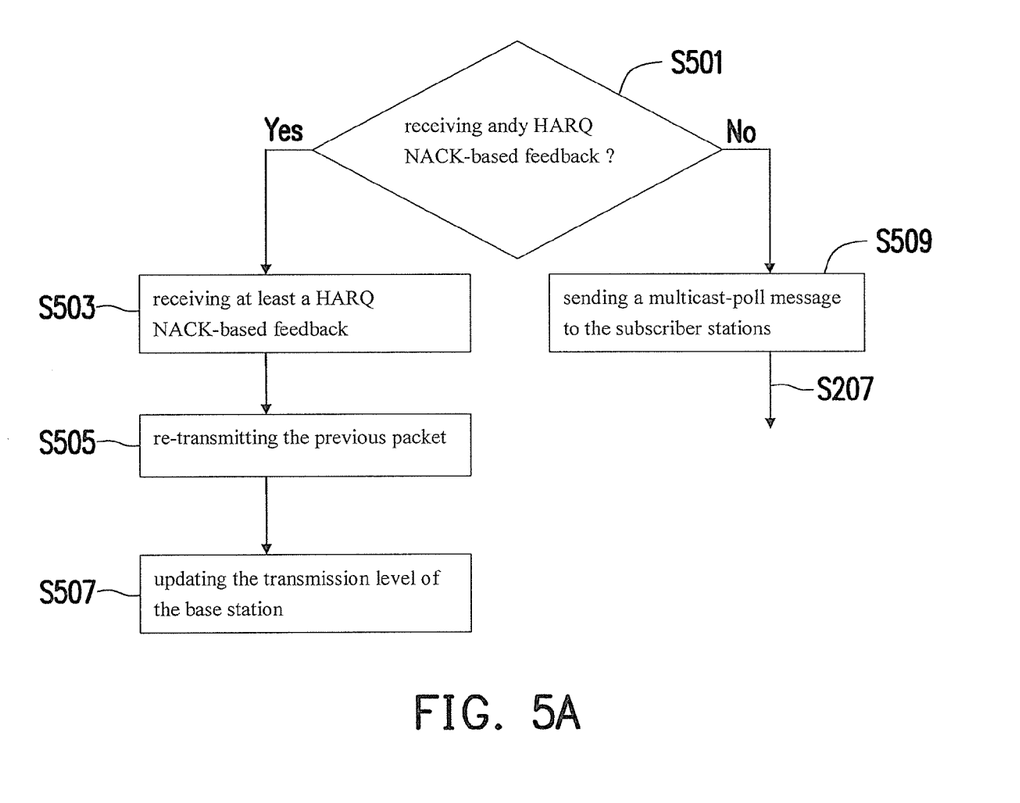
FIG. 5A is a flow chart showing an adapting process in consideration of whether at least an HARQ NACK-based feedback is received according to another embodiment of the present invention.

FIG. 5A is a flow chart showing an adapting process in consideration of whether at least an HARQ NACK-based feedback is received according to another embodiment of the present invention. As shown in FIG. 5A, during the multicast broadcast service flow is transmitted from the base station to the subscriber stations at a situation that the HARQ is enabled, every time the base station transmits a packet with respect to the multicast broadcast service flow to the subscriber stations, a feedback channel is reserved for the HARQ NACK-based feedback. In the step S501, an HARQ NACK-based feedback received status of the base station is checked. In the step S503 and the step S505, when at least a HARQ NACK-based feedback is received, the previous packet is re-transmitted to the subscriber station which issues the HARQ NACK-based feedback to the base station. Then, a transmission adapting process according to the HARQ NACK-based feedback received status is performed (step S507). That is, the transmission level of the base station is updated according to the HARQ NACK-based feedback received status showing that at least one HARQ NACK-based feedback is received. It should be noticed that the transmission adapting process can be initiated by consecutive HARQ NACK-Based feedbacks received by the base station. That is, the timing for initiating the transmission adapting process can be customized and the numbers of the consecutive HARQ NACK-Based feedbacks received by the base station can be varied with the customized design.

Figure 5B:
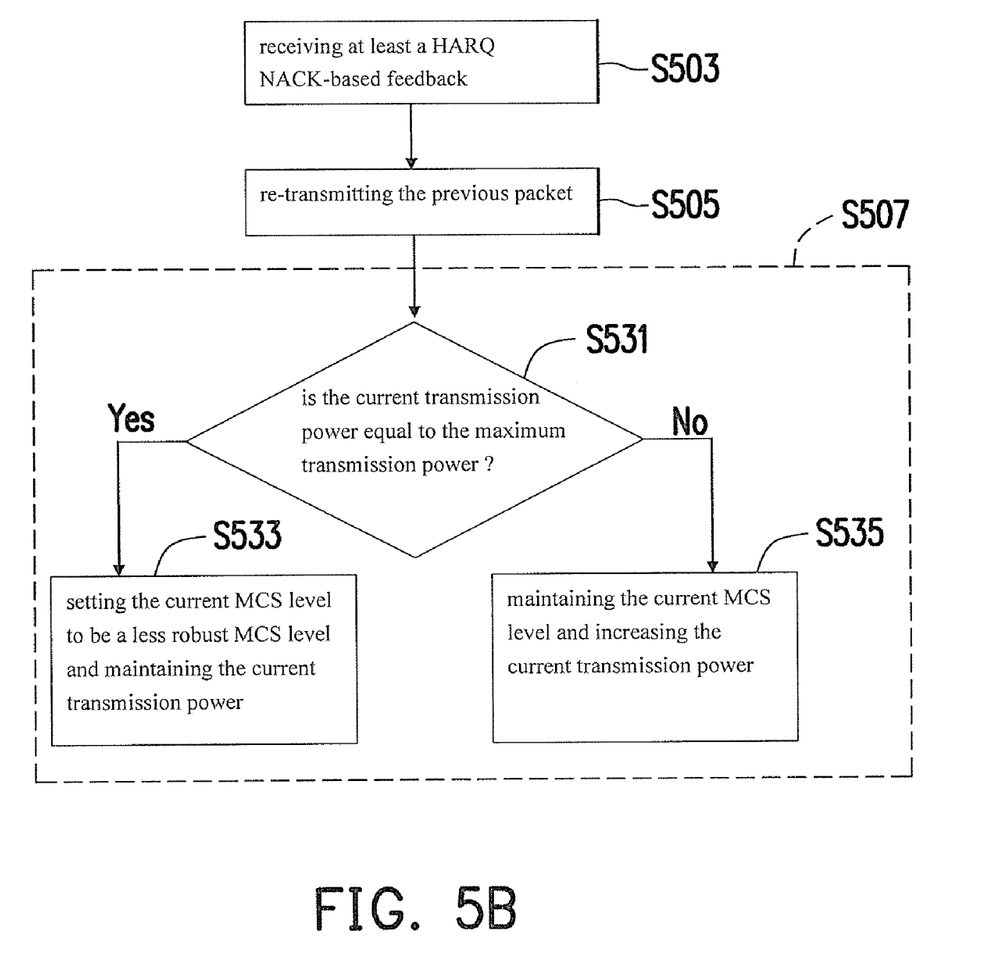
FIG. 5B is a flow chart showing a process for updating the transmission level of the base station according to the HARQ NACK-based feedback received status showing that at least one HARQ NACK-based feedback is received.

FIG. 5B is a flow chart showing a process for updating the transmission level of the base station according to the HARQ NACK-based feedback received status showing that at least one HARQ NACK-based feedback is received. As shown in FIG. 5B, in the step S531, the current transmission power is checked while the transmission adapting process (S507) is initiated. When the current transmission power is equal to the maximum transmission power, the transmission level of the base station is updated by setting the current MCS level to be a less robust MCS level and maintaining the current transmission power (step S533). Alternatively, when the current transmission power is smaller than the maximum transmission power, the transmission level of the base station is updated by maintaining the current MCS level and increasing the transmission power (step S535).

Alternatively, as shown in FIG. 5A, when the HARQ NACK-based feedback received status shows that no HARQ NACK-based feedback has been received, a multicast-poll message is sent to the subscriber stations (step S509). It should be noticed that the step S509 is equal to the step S205 shown in FIG. 2, which means the transmission adapting process is performed according to the later NACK-based feedback received status when no HARQ NACK-based feedback is received beforehand. It should be noticed that the timing for initiating another transmission adapting process (S203) can be customized to depend on numbers of consecutive HARQ queries without receiving any HARQ NACK-based feedback.

Since HARQ NACK-based feedback is a failure-transmission feedback for a single packet, the transmission adapting process according to the HARQ NACK-based feedback received status can be triggered almost every packet transmitted time which is about 1/30 seconds. Furthermore, in the present embodiment, the transmission adapting process according to the HARQ NACK-based feedback received status is triggered every time the HARQ NACK-based feedback is received. However, the present invention is not limited to this single HARQ NACK-based feedback trigger mechanism. That is, the transmission adapting process according to the HARQ NACK-based feedback received status can be triggered after two or more consecutive HARQ NACK-based feedbacks are received.

Figure 6:
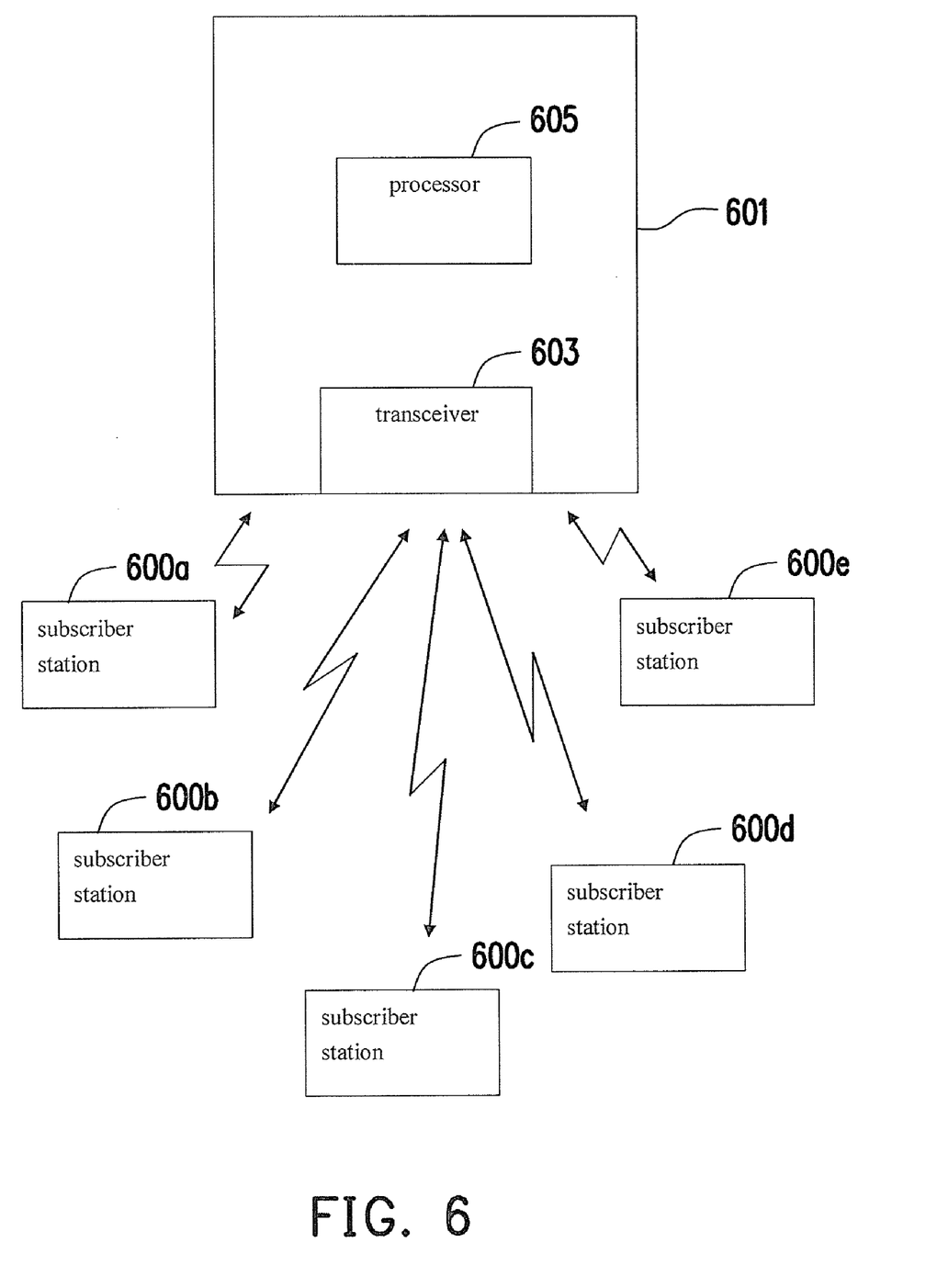
FIG. 6 is a block diagram showing an apparatus for implementing the method for dynamically adapting a transmission condition according to one embodiment of the present invention.

FIG. 6 is a block diagram showing an apparatus for implementing the method for dynamically adapting a transmission condition according to one embodiment of the present invention. In the present invention, the method for dynamically adapting a transmission condition can be implemented by an apparatus 601 shown in FIG. 6. The apparatus 500 comprises a transceiver 603 and a processor 605. The processor 605 is programmed with computer executable instructions in accordance with the embodiments shown in FIG. 2, FIG. 3 and FIG. 4. The computer executable instructions performs the steps of assigning a plurality of CDMA codes to a feedback corresponding to the multicast broadcast service flow (step S201 shown in FIG. 2) and then performing a transmission adapting process (step S203 shown in FIG. 2). Thereafter, the transmission adapting process is repeated. The transmission adapting process comprises steps of sending a multicast-poll message to the subscriber stations 600*a*, 600*b*, 600*c*, 600*d* and 600*e* through the transceiver 603 (step S205 shown in FIG. 2) and obtaining a feedback received status by monitoring the feedback channel through the transceiver 603 (step S207 shown in FIG. 2) and then adapting the current transmission level according to the feedback received status. Also, the processor 605 is programmed with the computer executable instructions for implementing the steps for further estimating the new transmission level (step S213 shown in FIG. 2, steps S301 through S311 and steps S401 through S411 shown in FIG. 3) after the step of adapting the current transmission level.

In the present invention, since the allocated feedback channel, either single common random access channel or multiple random access channel, is shared by subscriber stations in both of the awake/sleep mode and the idle mode, the uplink signaling overhead can be minimized. Furthermore, the use of CDMA code for the subscriber stations to indicate NACK feedback instead of a user-specific message can also minimize the signaling overhead. Moreover, the method for dynamically adapting transmission condition/radio resource disclosed by the present invention is applied not only to adjust the radio resource at a poor service quality but also to fine tune the radio resource at a service quality satisfying all the subscriber stations to increase the bandwidth efficiency.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for dynamically adapting a transmission condition of a base station for at least a multicast broadcast service flow transmitting to a plurality of subscriber stations at a current transmission level associated with a first modulation-and-coding scheme (MCS) level and a first transmission power, the method comprising:
   assigning a plurality of CDMA codes to a feedback corresponding to the multicast broadcast service flow;
   performing a transmission adapting process comprising:
      sending a multicast-poll message to the subscriber stations, wherein the multicast-poll message indicates a feedback condition of a new transmission level associated with a second MCS level and a second transmission power, the assigned CDMA codes and a feedback channel allocated for transmitting the feedback;
      adapting the current transmission level according to a feedback received status of the base station, wherein the feedback received status of the base station shows whether at least a NACK-based feedback is received from one of the subscriber stations, the NACK-based feedback is in a form of one of the assigned CDMA codes without containing any user-specific message and when the feedback received status of the base station shows at least a NACK-based feedback from one of the subscriber stations, which is unsatisfied with the feedback condition, is received, the current transmission level is maintained;
   updating the feedback condition under a circumstance that the feedback received status of the base station shows at least a NACK-based feedback from one of the subscriber stations, wherein:
      if the first transmission power is equal to the second transmission power and the first transmission power is smaller than a maximum transmission power for transmitting the multicast broadcast service flow, updating the new transmission level, which is indicated in the sent multicast-poll message, by maintaining the second MCS level and increasing the second transmission power;
      if the first transmission power is equal to the second transmission power and the first transmission power is equal to the maximum transmission power, updating the new transmission level, which is indicated in the sent multicast-poll message, by setting the second MCS level to be a less robust MCS level and maintaining the second transmission power;
      if the first transmission power is not equal to the second transmission power, updating the new transmission level, which is indicated in the sent multicast-poll message, by setting the second transmission power to be equal to the first transmission power and maintaining the second MCS level;
      updating the feedback condition according to the updated new transmission level; and
   repeating the transmission adapting process.

2. The method of claim 1, wherein the NACK-based feedback is in a form of one of the assigned CDMA codes corresponding to the multicast broadcast service flow and is transmitted through the feedback channel.

3. The method of claim 1, wherein, in the step of adapting the current transmission level, when the feedback received status of the base station shows no NACK-based feedback is received by the base station, the current transmission level is adapted to be equal to the new transmission level.

4. The method of claim 3, wherein, after the step of adapting the current transmission level, the transmission adapting process further comprises updating the feedback condition including:
if the first transmission power is equal to the second transmission power, updating the new transmission level, which is indicated in the sent multicast-poll message, by maintaining the second MCS level and decreasing the second transmission power;
if the first transmission power is not equal to the second transmission power and the power margin between the second transmission power and a maximum transmission power for transmitting the multicast broadcast service flow is large enough to accommodate an MCS adjustment, updating the new transmission level, which is indicated in the sent multicast-poll message, by setting the second MCS level to be a more robust MCS level and restoring the second transmission power to be equal to the maximum transmission power;
if the first transmission power is not equal to the second transmission power and the power margin between the second transmission power and the maximum transmission power is not large enough to accommodate an MCS adjustment, updating the new transmission level, which is indicated in the sent multicast-poll message, by maintaining the second MCS level and decreasing the second transmission power; and
updating the feedback condition according to the updated new transmission level.

5. The method of claim 1, wherein the multicast-poll message is sent to the subscriber stations through a control channel.

6. The method of claim 1, wherein the multicast-poll message is sent to the subscriber stations through a general broadcasting channel.

7. The method of claim 1, wherein the subscriber stations are at the operation modes including an awake mode, a sleep mode and an idle mode.

8. The method of claim 1, wherein the feedback channel includes a random access-based channel.

9. The method of claim 1, wherein the random access-based channel is a single common random access channel or a multiple random access channel.

10. The method of claim 1, wherein the feedback condition comprises signal-to-noise ratio (SNR), packet-error rate (PER), peak signal-to-noise ratio (PSNR) and channel-quality indicator (CQI).

11. The method of claim 1, wherein the step of repeating the transmission adapting process is performed in a periodical manner or an event-trigger manner.

12. An apparatus for dynamically adapting a transmission condition for at least a multicast broadcast service flow transmitting to a plurality of subscriber stations at a current transmission level associated with a first MCS level and a first transmission power, the apparatus comprising:
a transceiver;
a processor programmed with computer executable instructions to perform the steps of:
assigning a plurality of CDMA codes to a feedback corresponding to the multicast broadcast service flow;
performing a transmission adapting process comprising:
sending a multicast-poll message to the subscriber stations through the transceiver, wherein the multicast-poll message indicates a feedback condition of a new transmission level associated with a second MCS level and a second transmission power, the assigned CDMA codes and a feedback channel allocated for transmitting the feedback;
obtaining a feedback received status by monitoring the feedback channel through the transceiver;
adapting the current transmission level according to the feedback received status, wherein the feedback received status of the base station shows whether at least a NACK-based feedback is received from one of the subscriber stations, the NACK-based feedback is in a form of one of the assigned CDMA codes without containing any user-specific message and when the feedback received status shows at least a NACK-based feedback from one of the subscriber stations, which is unsatisfied with the feedback condition, is received, the current transmission level is maintained;
updating the feedback condition under the circumstance that the feedback received status shows at least a NACK-based feedback from one of the subscriber stations, wherein:
if the first transmission power is equal to the second transmission power and the first transmission power is smaller than a maximum transmission power for transmitting the multicast broadcast service flow, updating the new transmission level, which is indicated in the sent multicast-poll message, by maintaining the second MCS level and increasing the second transmission power;
if the first transmission power is equal to the second transmission power and the first transmission power is equal to the maximum transmission power, updating the new transmission level, which is indicated in the sent multicast-poll message, by setting the second MCS level to be a less robust MCS level and maintaining the second transmission power;
if the first transmission power is not equal to the second transmission power, updating the new transmission level, which is indicated in the sent multicast-poll message, by setting the second transmission power to be equal to the first transmission power and maintaining the second MCS level;
updating the feedback condition according to the updated new transmission level; and
repeating the transmission adapting process.

13. The apparatus of claim 12, wherein the NACK-based feedback is in a form of one of the assigned CDMA codes corresponding to the multicast broadcast service flow and is transmitted through the feedback channel.

14. The apparatus of claim 12, wherein, in the step of adapting the current transmission level, when the feedback received status shows no NACK-based feedback is received by the base station, the current transmission level is adapted to be equal to the new transmission level.

15. The apparatus of claim 14, wherein, after the step of adapting the current transmission level, the transmission adapting process further comprises updating the feedback condition including:
if the first transmission power is equal to the second transmission power, updating the new transmission level, which is indicated in the sent multicast-poll message, by maintaining the second MCS level and decreasing the second transmission power;

if the first transmission power is not equal to the second transmission power and the power margin between the second transmission power and a maximum transmission power for transmitting the multicast broadcast service flow is large enough to accommodate an MCS adjustment, updating the new transmission level, which is indicated in the sent multicast-poll message, by setting the second MCS level to be a more robust MCS level and restoring the second transmission power to be equal to the maximum transmission power;

if the first transmission power is not equal to the second transmission power and the power margin between the second transmission power and the maximum transmission power is not large enough to accommodate an MCS adjustment, updating the new transmission level, which is indicated in the sent multicast-poll message, by maintaining the second MCS level and decreasing the second transmission power; and updating the feedback condition according to the updated new transmission level.

16. The apparatus of claim 12, wherein the multicast-poll message is sent to the subscriber stations through a control channel.

17. The apparatus of claim 12, wherein the multicast-poll message is sent to the subscriber stations through a general broadcasting channel.

18. The apparatus of claim 12, wherein the subscriber stations are at the operation modes including an awake mode, a sleep mode and an idle mode.

19. The apparatus of claim 12, wherein the feedback channel includes a random access-based channel.

20. The apparatus of claim 19, wherein the random access-based channel is a single common random access channel or a multiple random access channel.

21. The apparatus of claim 12, wherein the feedback condition comprises signal-to-noise ratio (SNR), packet-error rate (PER), peak signal-to-noise ratio (PSNR) and channel-quality indicator (CQI).

22. The apparatus of claim 12, wherein the step of repeating the transmission adapting process is performed in a periodical manner or an event-trigger manner.

* * * * *